(12) United States Patent
Stech

(10) Patent No.: US 8,869,850 B2
(45) Date of Patent: Oct. 28, 2014

(54) AXLE TO AXLE SEALED AIRWAY FOR AN ONBOARD AUTOMATIC TIRE INFLATION SYSTEM

(75) Inventor: Clyde G. Stech, Lockhart, TX (US)

(73) Assignee: Fleet Technologies, LLC, Cleveland, OH (US)

( * ) Notice: Subject to any disclaimer, the term of this patent is extended or adjusted under 35 U.S.C. 154(b) by 391 days.

(21) Appl. No.: 13/304,609

(22) Filed: Nov. 25, 2011

(65) Prior Publication Data

US 2012/0067482 A1 Mar. 22, 2012

Related U.S. Application Data

(63) Continuation-in-part of application No. 12/657,629, filed on Jan. 25, 2010, now Pat. No. 8,327,895.

(60) Provisional application No. 61/458,488, filed on Nov. 24, 2010, provisional application No. 61/477,722, filed on Apr. 21, 2011.

(51) Int. Cl.
*B60C 23/00* (2006.01)

(52) U.S. Cl.
CPC .................................. *B60C 23/003* (2013.01)
USPC ........................................ 152/417; 152/415

(58) Field of Classification Search
CPC ................................................... B60C 23/003
USPC ......................................... 152/415, 416, 417
See application file for complete search history.

(56) References Cited

U.S. PATENT DOCUMENTS

| | | | | |
|---|---|---|---|---|
| 1,657,023 A | * | 1/1928 | Mitchell et al. | 152/417 |
| 2,908,241 A | | 10/1959 | Todd | |
| 5,377,736 A | * | 1/1995 | Stech | 277/414 |
| 6,105,645 A | * | 8/2000 | Ingram | 152/415 |
| 6,145,559 A | * | 11/2000 | Ingram, II | 152/417 |
| 7,117,909 B2 | * | 10/2006 | Jarrett et al. | 152/416 |
| 7,185,688 B2 | * | 3/2007 | Hayes et al. | 152/417 |
| 8,223,006 B2 | * | 7/2012 | Wilson et al. | 340/449 |
| 2005/0000615 A1 | * | 1/2005 | Ingram | 152/417 |

OTHER PUBLICATIONS

International Search Report/Written Opinion established by the European Patent Office on Mar. 2, 2012.

* cited by examiner

*Primary Examiner* — Kip T Kotter
(74) *Attorney, Agent, or Firm* — Robert C. Klinger

(57) ABSTRACT

An automatic onboard drive axle tire inflation system configured for use in vehicles having an articulating joint, including but not limited to drive axles that include a steerable axle and a vertically movable wheel such as used in independent suspension systems. Various embodiments of the invention deliver pressurized air from an inner axle to an outer axle, such as through a CV joint, which embodiments can withstand the significant heating generated by braking systems. One preferred embodiment includes a flexible tube extending from an inner drive axle to an outer drive axle, wherein the tube maintains a seal there between, and articulates in one or both drive axles to accommodate the varying distance and angle therebetween during the steering of the associated wheel. The system can be employed in any vehicle including an automobile, truck and tractor.

28 Claims, 12 Drawing Sheets

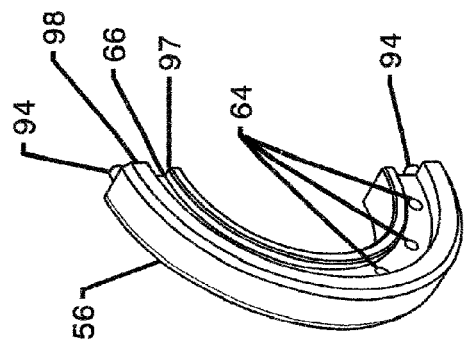
Figure 11
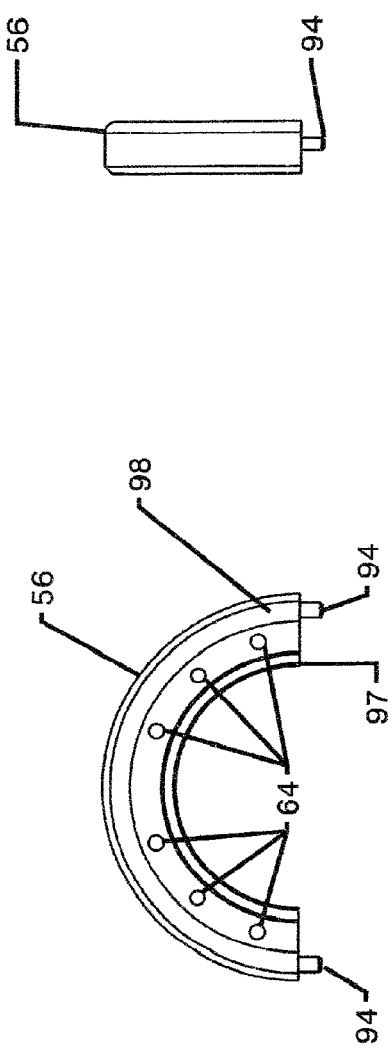
Figure 9
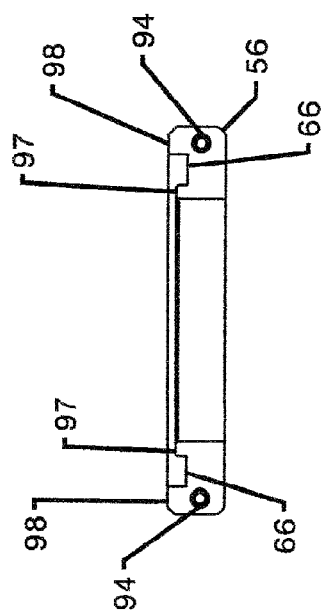
Figure 10
Figure 12

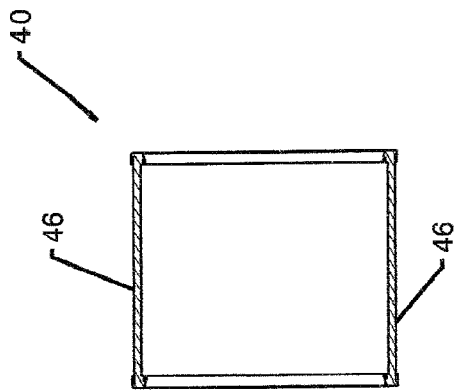
Figure 15
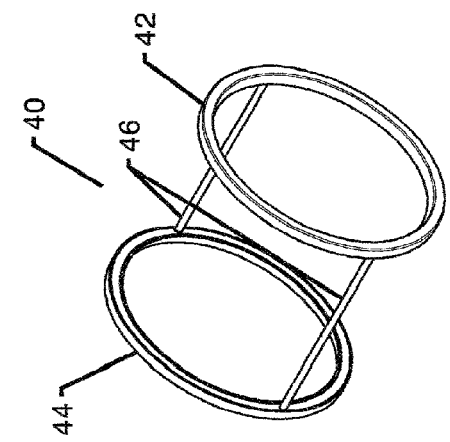
Figure 16
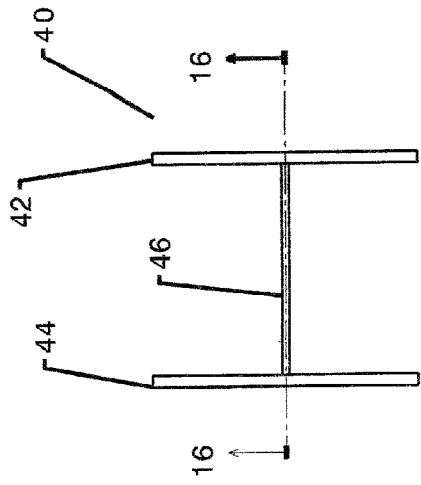
Figure 14
Figure 13

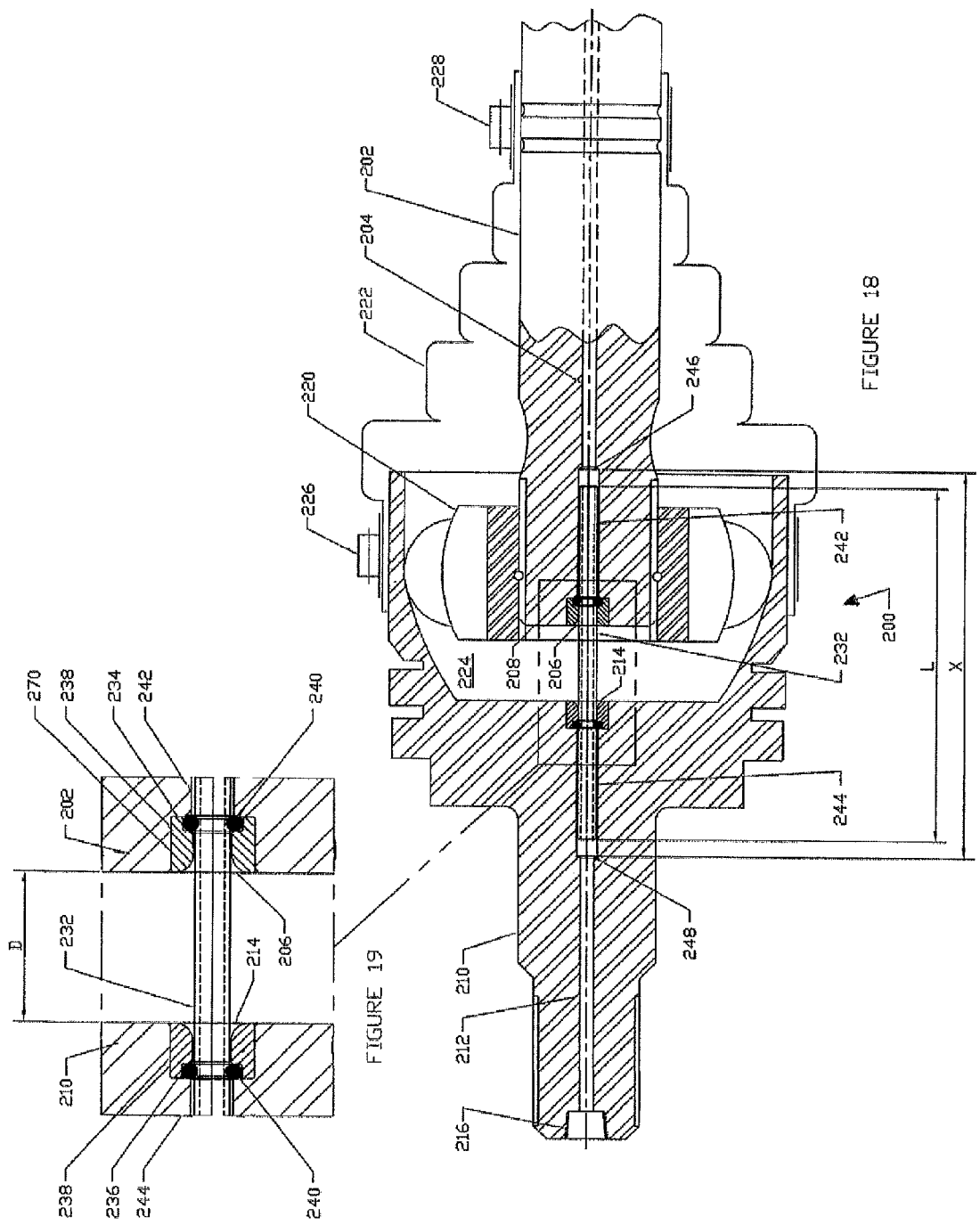

AXLE TO AXLE SEALED AIRWAY FOR AN ONBOARD AUTOMATIC TIRE INFLATION SYSTEM

CLAIM OF PRIORITY

This application is a Continuation-in-Part of U.S. patent application Ser. No. 12/657,629 filed Jan. 25, 2010 now U.S. Pat. No. 8,327,895 entitled Drive Axle Seal Body and Tire Inflation System. This application claims priority of commonly assigned U.S. Provisional Patent Application Ser. No. 61/458,488 filed Nov. 24, 2010 entitled System for Sealing and Delivering Air to and from a Vehicle's Drive and Steer Axles, and also claims priority of commonly assigned U.S. Provisional Patent Application Ser. No. 61/477,722 filed Apr. 21, 2011 entitled Shaft to Shaft Sealed Airway for an Onboard Automatic Tire Inflation System in a CV Joint Axle, the contents of each incorporated herein by reference.

FIELD OF THE INVENTION

The present invention is generally related to vehicle tire inflation systems, and particularly to vehicles having driven axles with an articulating joint, such as a steerable front wheel having a CV joint, and a rear wheel having a vertically movable axle in an independent suspension system.

BACKGROUND OF THE INVENTION

Vehicle tire inflation systems are typically installed in truck trailers to deliver pressurized air to tires and maintain air pressure at a safe level during operation. Typically, these tire inflation systems are employed on truck trailers which do not have the drive axles. This is because pressurized air can be easily routed either within or along the non-rotating trailer axle and delivered to the rotating tires, such as via a rotary union. Examples of some drive axle tire inflation systems invented by the applicant of the present invention can be seen in U.S. Pat. Nos. 5,287,906, 5,377,736, and 6,425,427, the teachings of which are incorporated herein by reference.

The industry has accepted inflation technology for trailers, which technology uses the axle beam as a conduit for air delivery, whether the axle itself is pressurized and conducts air, or a separate, internal air line extending therealong is used. This method of air delivery is optimal as it keeps external plumbing in critical areas to a minimum, and it delivers air to the center of the wheel hub base or hubcap for delivery to the respective tires.

Applicant advanced the state of the art in commonly assigned U.S. patent application Ser. No. 12/657,629 filed Jan. 25, 2010 entitled Drive Axle Seal Body and Tire Inflation System, which application discloses delivering pressurized air through a rotating drive axle to deliver air to tires driven by the drive axle. This invention achieves technical advantages in drive axles having splines disposed about the drive axle, which splines complicate the delivery of pressurized air because of the complicated dimensioning of the splines having a diameter greater than the diameter of the drive axle.

Currently, there is no known axle technology capable of delivering pressurized air to a driven axle having an articulating joint, such as an open/exposed and/or steerable axle, and a vertically movable rear wheel forming part of an independent suspension system. Driven front axles employed in automobiles typically include a Constant Velocity (CV) joint. These CV joints typically comprise an inner drive axle shaft coupled by an articulating linkage to an outer drive axle shaft, where the relative angle and/or distance between the inner and outer drive shafts varies as the wheel is turned on the front axle, and on the rear axle as weight is added or the suspension moves. The complexities and complications of multiple interconnected drive shafts, and a variable linkage between the drive shafts, prevent the usage of conventional automatic onboard tire inflation systems. Moreover, the outer drive shaft and wheel assembly is subject to significant heat generated by the associated brakes. It is common for the outer drive axle and wheel to reach high temperatures as high as 300 degrees Fahrenheit.

There is desired an automatic onboard axle tire inflation system configured for use in driven axles having an articulation joint, including open/exposed and/or steerable axles, including but not limited to drive axles that include a CV joint, and in vertically movable rear wheels in a reliable and cost effective manner.

SUMMARY OF INVENTION

The present invention achieves technical advantages by providing an automatic onboard drive axle tire inflation system configured for use in vehicles having an articulating joint, including but not limited to drive axles that include a steerable axle and a vertically movable wheel such as used in independent suspension systems. Various embodiments of the invention deliver pressurized air from an inner axle to an outer axle, such as through a CV joint, which embodiments can withstand the significant heating generated by braking systems. One preferred embodiment includes flexible tubing extending from the inner axle to the outer axle, wherein the tubing articulates in one or both axles to accommodate the varying distance and angle therebetween during the steering of the associated wheel, or vertical movement thereof. Another embodiment fixes one end of the tube to one of the axles, while the other end plunges within the other axle. Another embodiment delivers air between the drive axles via a fluidly sealed chamber defined between interfaces of the inner and outer drive axle. The system can advantageously be installed in automobiles as well as all vehicles with an open/exposed and/or steerable axle and a movable rear wheel.

BRIEF DESCRIPTION OF THE DRAWINGS

FIG. 9 is a perspective view of one alignment flange depicted in FIG. 3;

FIG. 10 is a front view of the alignment flange shown in FIG. 9;

FIG. 11 is an side view of the alignment flange shown in FIG. 9;

FIG. 12 is an end view of the alignment flange shown in FIG. 9;

FIG. 13 is a perspective view of the radial shaft seal of FIG. 3;

FIG. 14 is an end view of the radial shaft seal shown in FIG. 13;

FIG. 15 is a side view of the radial shaft seal shown in FIG. 13;

FIG. 16 is a side sectional view of the radial shaft seal shown in FIG. 13;

FIG. 18 is a side sectional view of an open/exposed and/or steerable drive axle including a CV joint coupling an inner axle to an outer axle;

FIG. 19 is an enlarged view of a flexible tube extending between the inner axle and the outer axle, wherein the flexible tube plunges and articulates in a bore defined in each axle during steering and suspension displacement;

DETAILED DESCRIPTION OF THE PRESENT INVENTION

Figure 1:
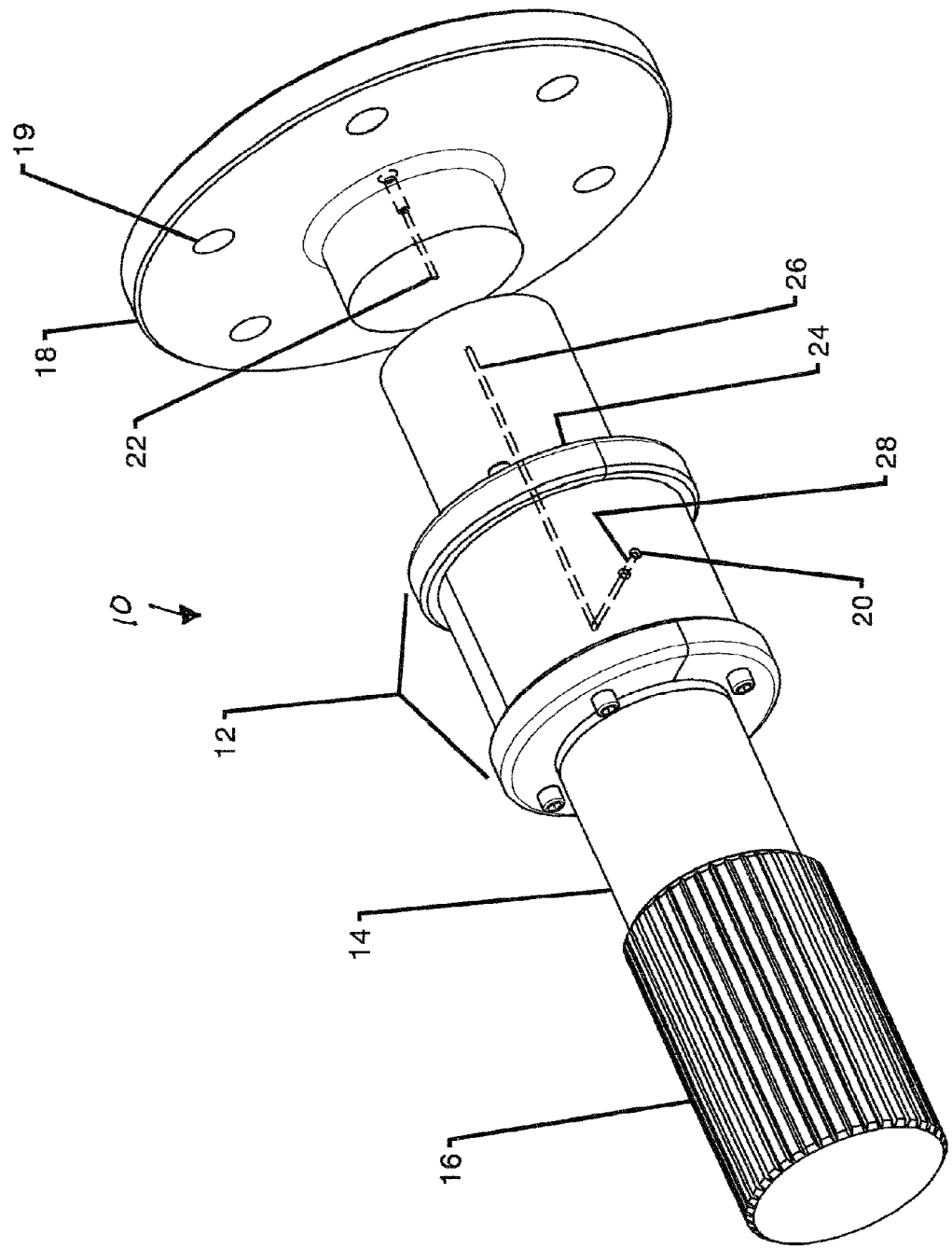
FIG. 1 is a perspective view of a drive axle sealing body according to one embodiment of the present invention.
Figure 2:
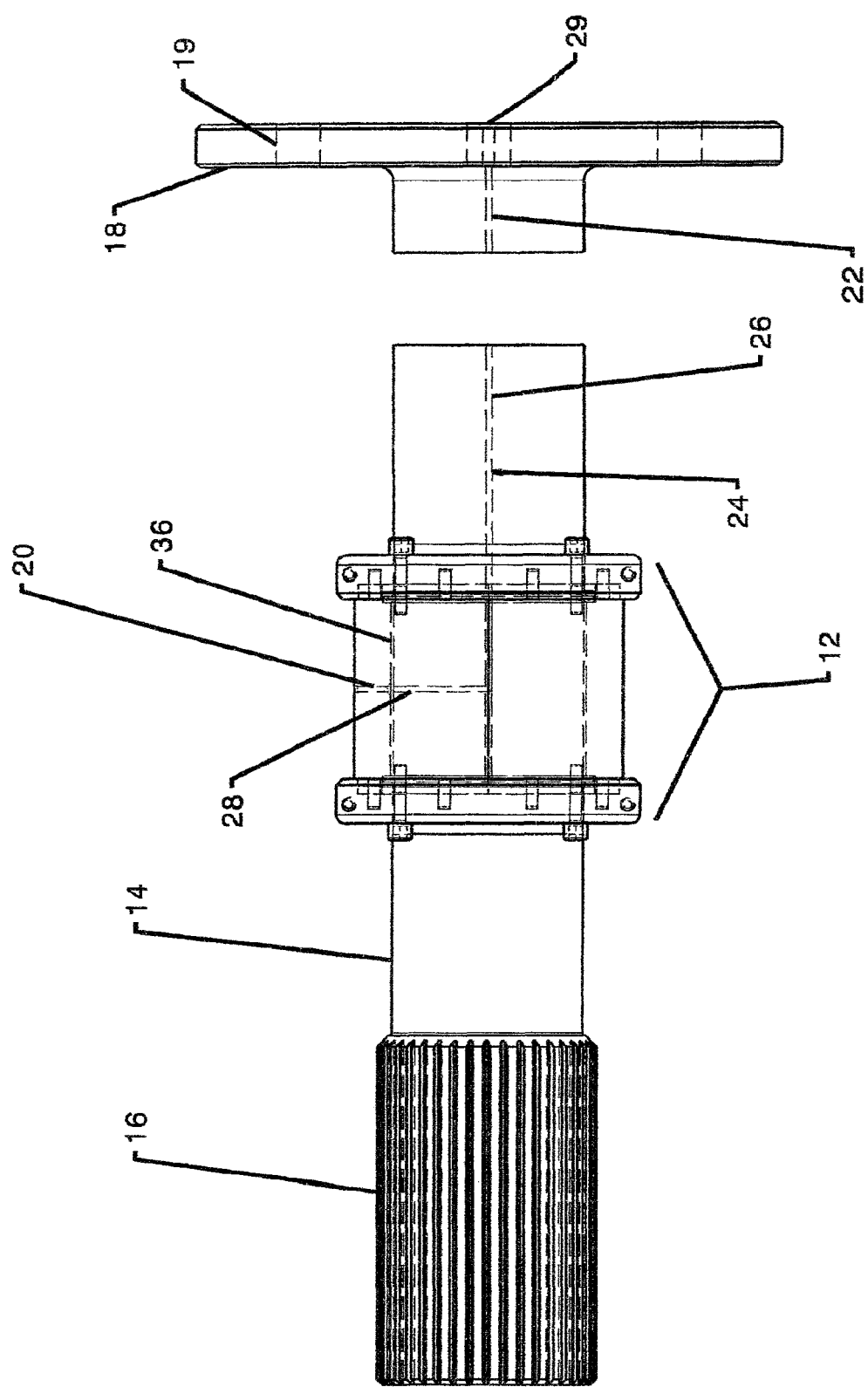
FIG. 2 is a side elevational view of the sealing body of FIG. 1 depicting an air conduit extending thru the solid drive axle and communicating air from the sealing body to the center & out the axle flange.

Referring now to FIG. 1 there is generally shown at 10 a drive axle tire inflation system including a sealing body 12 disposed about a vehicle drive axle 14 axially extending therethrough. Drive axle 14 is seen to include a driving portion comprising of radially extending splines 16 at the proximal end of drive axle 14. An axle flange 18 having stud holes 19 is secured to the distal end of drive axle 14 and is configured to secure to tires (not shown). Sealing body 12 is further comprised of an air passageway 20 extending thru a central portion of the sealing body 12, configured to communicate air pressure from the air passageway 20 to an air passageway 22 axially extending thru a central portion of the axle flange 18 via a drive axle air passageway 24 as shown in FIG. 2 extending thru the solid drive axle 14. The sealing body 12 is configured to be secured to the vehicle body (not shown) and remain stationary while drive axle 14 is rotated therewithin. The drive axle air passageway 24 has an axially extending portion 26 configured to align with and deliver air pressure to the center of flange end air passageway 22, and also has a radially extending portion 28 extending to the outer surface of the drive axle 14 at location within the sealing body 12. Sealing body 12 defines a sealed air chamber 36 as shown in FIG. 2 about the drive axle 14 such that pressurized air delivered from air source passageway 20 is communicated to the drive axle air passageway 24 even when the radially extending portion 28 is not aligned with air source passageway 20.

FIG. 2 depicts a side elevational view of the system 10 shown in FIG. 1 including the axially extending portion 26 of the drive axle air passageway 24 and the radially extending portion 28. As shown, the drive axle air passageway portion 26 is axially aligned with the axle flange air passageway 22 at the center of the axle flange 18. Also shown is the air chamber 36 defined between the drive axle 14 and chamber bodies 30 and 32 sealed thereabout as the drive axle 14 is rotated. Air provided to air passageway 22 is communicated via opening 29 to the tires, such as via quick connects (not shown).

Figure 3:
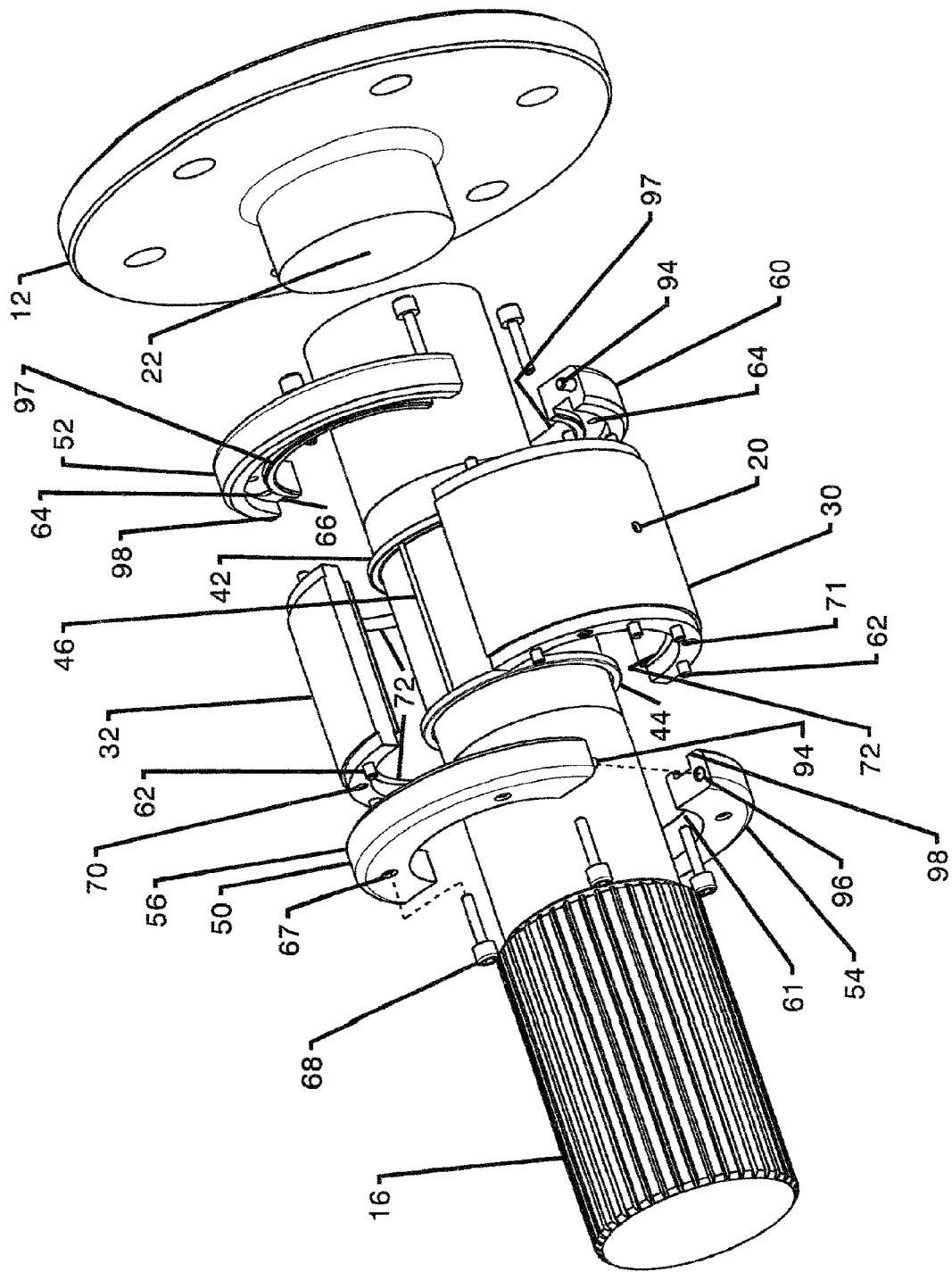
FIG. 3 is an exploded view of the sealing body depicted in FIG. 1.

Referring now to FIG. 3 there is shown an exploded view of the sealing body 12 seen to comprise the first arcuate chamber body 30 and the second arcuate chamber body 32 juxtaposed with the first sealing body 30 and together forming a continuous chamber body about a mid portion 34 of the drive axle 14. Disposed about the mid portion 34 of drive axle 14 is seen a horizontal/radial shaft seal 40 comprising a first annular ring seal 42 and a second annular ring seal 44 joined by a pair of laterally extending longitudinal seals 46 extending parallel to the drive axle 14. The annular ring seals 42 and 44 are secured between the respective seal body flanges 72 and end cap inner flanges 97. The horizontal/radial shaft seals 46 are secured about the mid portion 34 defined between the axle flange 12 and the splines 16 between seal body flanges 74.

Further shown in FIG. 3 is a pair of end caps, comprising alignment end caps 50 and 52 each secured to and positioned at respective ends of the seal bodies 30 and 32, as shown. The first alignment end cap 50 is seen to comprise of a first arcuate flange member 54 and a second arcuate flange member 56 juxtaposed to each other and sealingly disposed about drive axle 14 extending therethrough. The second end cap 52 is seen to comprise of a first arcuate flange member 58 and a second arcuate flange member 60 juxtaposed therewith, sealingly disposed about the drive axle 14, similar to end cap 50. Each of the flange members has an inner arcuate surface 61 having a radias of curvature similar to the outer diameter of drive axle portion 34 to maintain a seal between surface 61 and the drive axle 14. The sealed cavity 36 is defined by the seal bodies 30 and 32, the end caps 50 and 52 comprising alignment flanges 54 and 56, 58 and 60, respectfully, and the horizontal/radial shaft seal 40 comprising seals 42, 44 and 46. This sealed housing makes up the air cavity/fluid chamber 36 which allows air to flow into passageway 24 to passageway 22 of the axle flange 12. The end caps 50 and 52 precisionally align the seal bodies 30 and 32 to create the sealed cavity 36 about the rotatable drive axle 14 and provide a reliable sealed cavity 36 over extended operation of the seal body 12. The end caps 50 and 52 and seal bodies 30 and 32 secure the seals 42, 44 and 46 to maintain a seal when secured thereabout and the sealed cavity 36 is pressurized.

The drive axle portion 34 is typically machined and plated, such as chrome plated, and the arcuate surfaces 61 are typically comprised of a bronze alloy or other bearing alloy, to prevent wear over time, minimize friction and minimize generated heat by rotation of the drive axle 14 thereagainst.

As shown in FIG. 3, the seal body members 30 and 32 have a plurality of dowel pins 62 configured to precisionally align with and be received in respective openings 64 defined in a flange surface 66 of the flange members, as shown. The flange members 54, 56, 58 and 60 are also provided with openings 67 laterally extending therethru and configured to receive a fastener 68 extending therethru and securing to a respective threaded/tapped opening 70 formed in the end surface of the respective seal body 30 and 32. The interfacing surfaces of the seal bodies 30 and 32 are positioned along a mid-section of the respective alignment flanges 54, 56, 58 and 60 to provide a mechanically rigid structure.

When assembled, the sealing body 12 is aligned about the sealing ring 40 and is secured in the axial and longitudinal direction with respect to the drive axle 14. As shown in FIG.

3, the sealing chambers 30 and 32 have arcuate flange surfaces 71 configured to align with and engage the respective alignment flange surfaces 66, abutting the opposing surface thereof. The horizontal/radial seal 46 seals the seal bodies 30 & 32 horizontally, and radial seals 42 & 44 seal the seal bodies with the end caps 50 (54 & 56) and 52 (58 & 60). The inner flange 97 of each flange member 52, 54, 58 and 60 is configured to secure against the opposing outer side surface of the respective alignment ring 42 and 44. Seal 42 and 44 sealingly reside in a respective groove defined by flanges 72 of the seal bodies 30 and 32 and against the drive axle 14. Seal 46 sealingly resides in a groove defined by the interfacing flanges 74 of seal bodies 30 and 32 and against the drive axle 14

During assembly, the radial seal rings 42, 44, & horizontal seal 46, and all inside surfaces of the sealing body 12 are pre-lubricated. The sealing body 12 stays lubricated about the rotating drive axle 14 by a ball bearings rotating in the lubricant inside the differential housing, as lubrication vapors will penetrate from outside of seal body as here is a minute gap of about 0.002-0.003 inches thick between outside of flange members 52, 60, etc and the axle 14 that the vapors will seep into.

Figure 4:
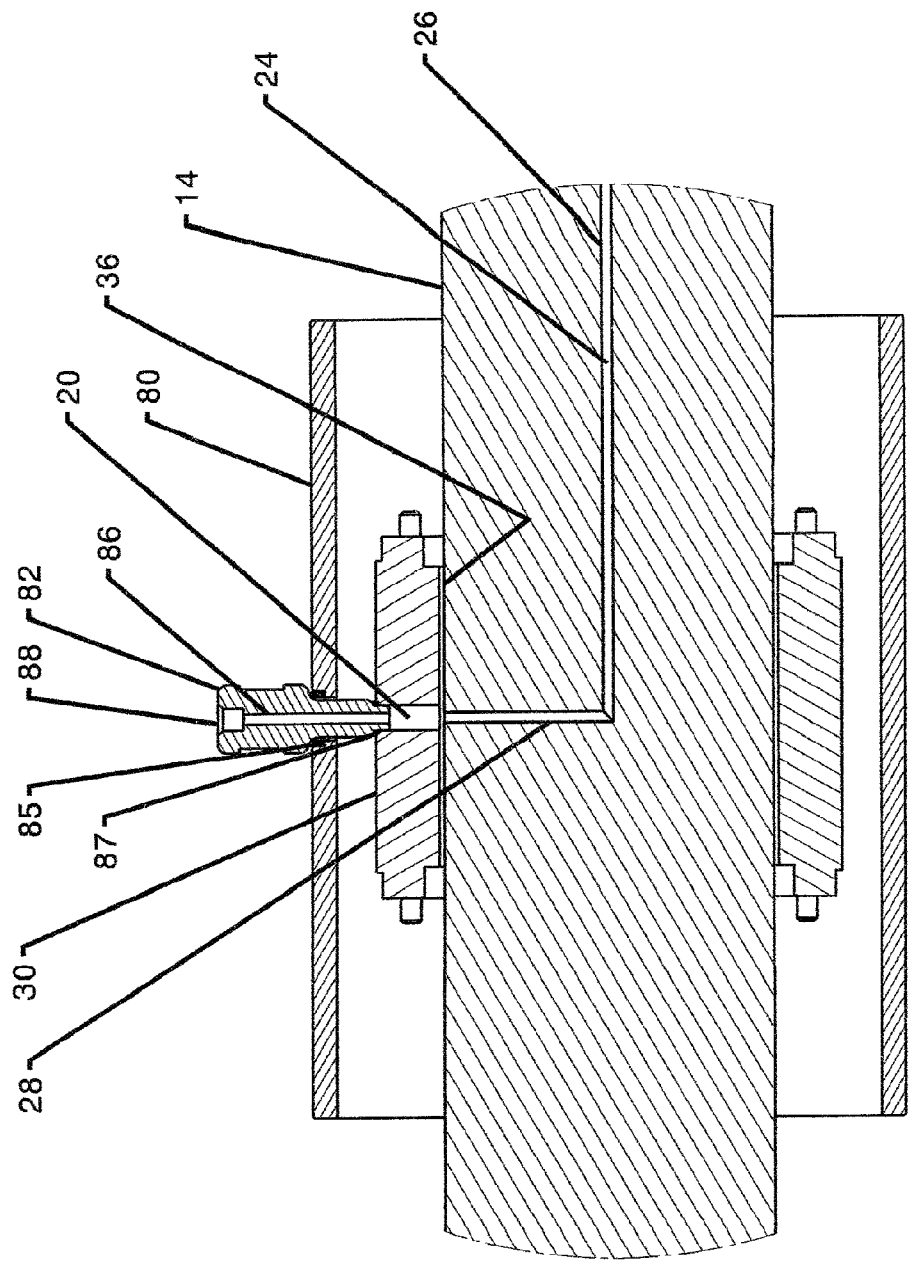
FIG. 4 is a side sectional view of the sealing body taken along the sealing body air conduit of FIG. 1 shown communicating with the drive axle air conduit.

Referring now to FIG. 4, there is shown a cross section of the sealing body 12 disposed about the drive axle 14, whereby the sealing body 12 and the drive axle 14 are positioned in a differential housing 80. A threaded tubular shaft 82 is seen to be disposed thru an opening 84 formed thru the wall of the differential housing 80 and which is aligned with and inserted into the air source opening 20 of sealing body 12, as shown. The shaft 82 prevents the sealing body 12 from moving along the axle 14.

Threaded tubular shaft 82 has an axially extending air passageway 86 in fluid communication with the air source opening 20, and 88 is a tapped hole to receive a connector that connects to a pneumatic source (not shown). A radial seal 85 is disposed about opening 84, and an inner o-ring seal 87 is sealingly disposed between pilot shaft 82 and opening 20. Advantageously, the present invention does not require any plumbing between the rotating axle shaft 14 and the interior wall of the differential housing 80. Further, the present invention does not require any expensive exposed parts or expensive reworks to critical spindles, hubs, bearing housing, etc. The present invention does not require any exposed plumbing around any brakes or wheel ends, or in other critical areas. Rather, the present invention provides an air source to the drive axle in protected areas, and to the wheel hub and tires in protected areas, in areas that have already been proven to work on common trailer systems.

Advantageously, the drive axle 14 only requires a minimal rework to the axle shaft itself. Preferably, the drive axle 14 is machined at portion 34 and is preferably plated to reduce friction and provide an air seal when the flange members of the sealing body 12 are sealingly disposed thereabout. The drive axle passageway 24 is easily created by boring the axle portion 26 centered horizontally in the axle 14, such as 18 inches, and the air passageway portion 28 centered vertically, which may be less than 12 inches.

The sealing body 12 achieves technical advantages because it can be assembled about the drive shaft 14 even when the splines 16 have an outer diameter greater than the drive axle portion 34 disposed between the splines 16 and the distal end thereof. It is noted that the sealing body 12 may also be configured of a unitary body and axially disposed over the drive axle portion 34 if the splines 16 are configured to have the same diameter as the drive axle portion 34.

Figure 5:
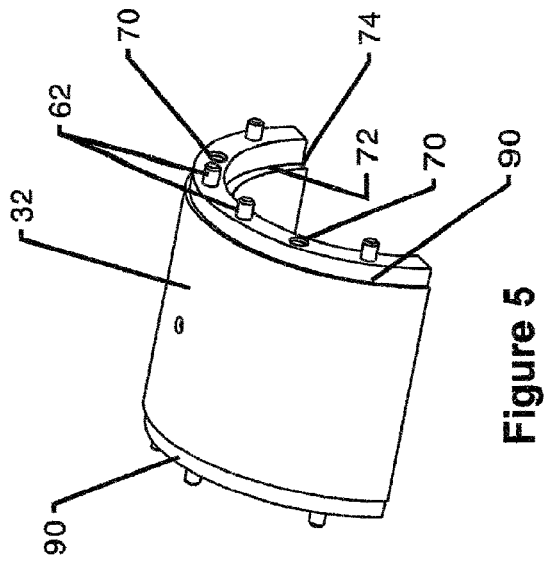
FIG. 5 is a perspective view of one seal body forming the exterior portion of the sealing body shown in FIG. 3.

Referring now to FIG. 5 there is shown a perspective view of seal body 32, depicting the dowel pins 62 and the tapped openings 70, as well as inner flanged portions 72 and outer flange portion 90. Seal bodies 30 and 32 are similar, where seal body 30 further includes air source passageway 20 defined there through.

Figure 6:
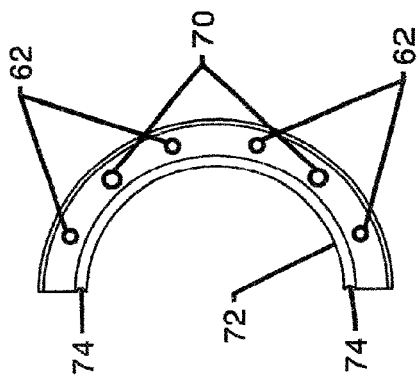
FIG. 6 is an end view of the seal body shown in FIG. 5.

FIG. 6 depicts an end view of the seal body 32 depicting the arcuate flange 72 for securing seals 42 and 44, and the lateral flange 74 for securing seal horizontal/radial seal 46, the dowel pins 62, and the tapped openings 70.

Figure 7:
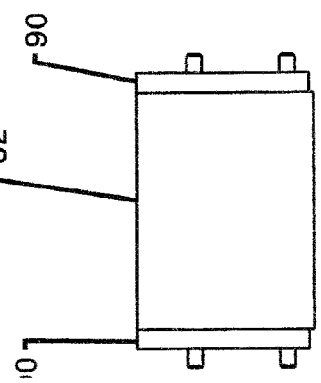
FIG. 7 is a side view of the seal body shown in FIG. 5.

FIG. 7 depicts a side view of the seal body 32, and outer flanged portions 90 configured to align with and abut the respective alignment flange when inserted therein.

Figure 8:
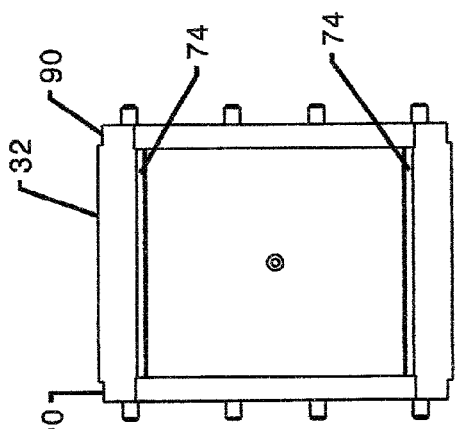
FIG. 8 is a inside view of the seal body shown in FIG. 5.

Referring now to FIG. 8, there is shown an inside end view of chamber body 32.

Referring now to FIG. 9, there is shown a perspective view of flange member 56, depicting the lower flange surface 66 and the openings 64 extending therethru. Alignment flange 56 is seen to include a pair of dowel pins 94 configured to be aligned with and received respective end openings of flange member 54. It is noted that alignment flanges 56 and 60 are structurally identical, and alignment flanges 54 and 58 are structurally identical and similar to flanges 56 and 60 but have recesses 96 corresponding to receive opposing dowel pins 94. The flange member 56 is seen to include the inner seal compression lip 97 configured to engage the respective annular seal 42 and 44 to prevent the seals from rotating inside the seal body 12. The flange member 56 is also seen to comprise an outer seal retaining lip 98 configured to hold the seal bodies 30 and 32 together when pressurized.

Referring now to FIG. 10, there is shown a side view of alignment flange 56 and 60.

Referring now FIG. 11 there is shown an end view of flange 56 and 60.

Referring now to FIG. 12, there is shown an end view of the alignment flange member 56 and 60.

Referring now to FIG. 13 there is shown a perspective view of the horizontal/radial shaft seal 40, including the proximal ring seal 44, the distal ring seal 42 and the pair of laterally extending seals 46.

Referring now to FIG. 14 there is shown an end view of the horizontal/radial shaft seal 40 including an axial opening 48 configured to receive the drive axle 14. During assembly, this radial shaft seal 40 is secured to the plated drive axle portion 34, by the seal bodies 30 and 32 and end cap flange members 50 and 52.

The end caps/flanges 50 and 52 may be comprised of a bronze alloy, or some other alloy with similar bearing properties. The horizontal/radial shaft seal 40 may be comprised of rubber, and preferably Viton. However, other suitable materials may be employed as desired, depending on factors such as strength, weight, cost, environmental factors such as corrosion and so forth. The fasteners 68 may be comprised of socket head cap screws. If desired, the alignment flanges may be provided with a chamber body bearing end cap and may be comprised of a bronze alloy. The alignment flanges that engage the rotating drive axle 14 may comprise of a bronze alloy as well, which is preferred as it has extended wear capabilities and can withstand substantial heat.

Figure 17:
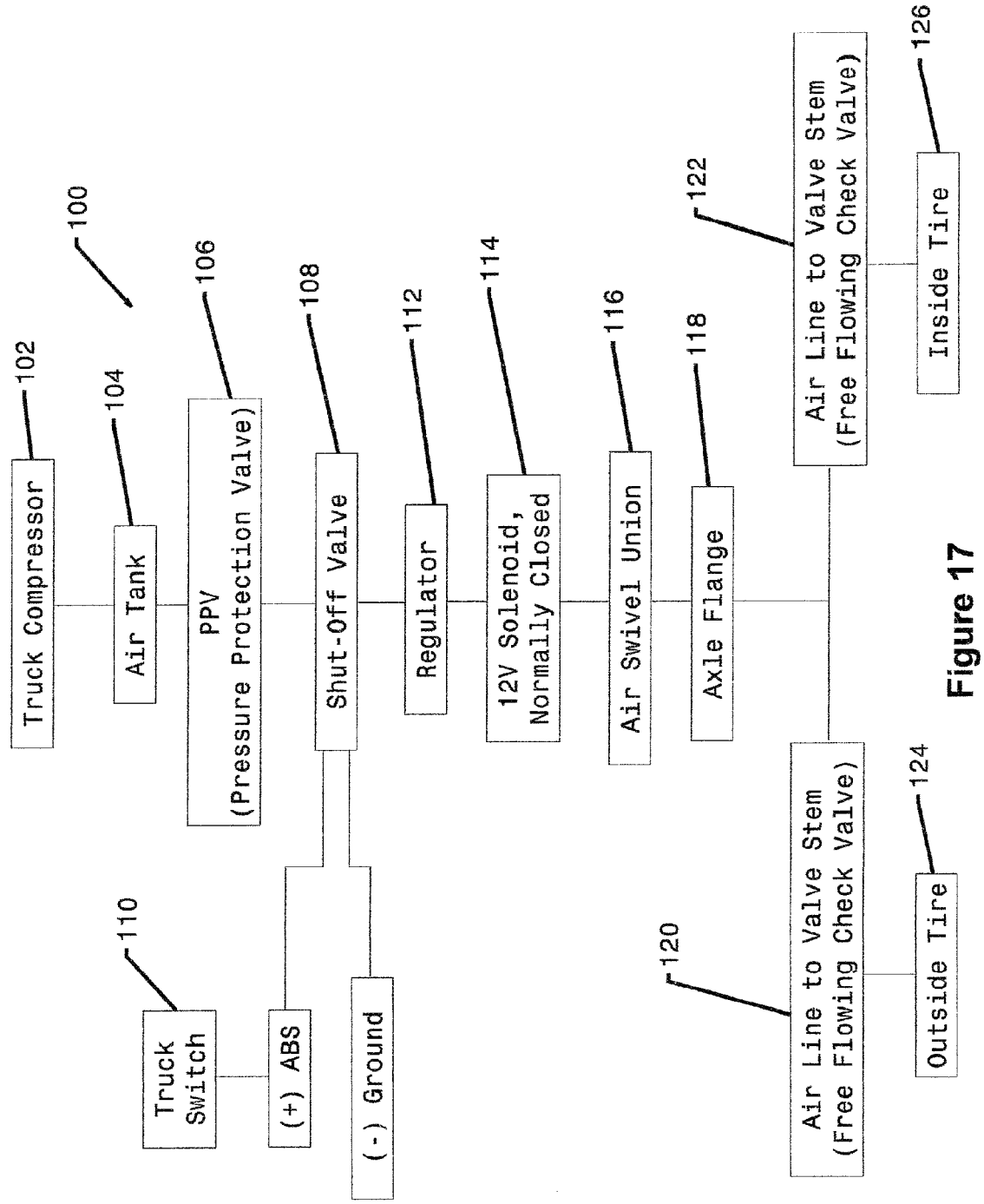
FIG. 17 is a block diagram of a tire inflation system that may include the sealing body.

Referring now to FIG. 17, there is depicted a block diagram of an air inflation system configured to employ system 10 including the sealing body 12. As depicted, a truck compressor 102 may provide an air source to an air tank 104 which communicates pressurized air to a pressure protection valve 106. The pressure protection valve 106 is configured to communicate pressurized air to a shut off valve 108 which may be electrically operated by a truck switch 110. The pressurized air is configured to be provided via a regulator 112 to a solenoid 114 that is normally closed. The pressurized air may be communicated from solenoid 114 to a sealed body 116 and an axle flange 118. Pressurized air thru the axle flange 118 is provided via a respective air line to valve stem 120 to the respective outside tire 124 and also to the valve stem as 122 to the respective inside tire 126.

The present invention achieves technical advantages by delivering an air source via a drive axle to the center of the wheel hub and associated tires in a reliable and cost effective manner. The sealing body and tire inflation system can be performed at the axle factory. The present invention finds particular advantages in medium and heavy duty vehicles, such as in semi tractors, but also has applications in other vehicles and automobiles. The sealing body provides a reliable system providing air thru a rotating drive axle to a center portion of the axle flange, without involving complicated plumbing, or extensive modification of the drive axle system.

Referring now to FIG. 18, there is shown at 200 an automatic onboard tire inflation system configured to be utilized in a vehicle having a driven wheel and an articulating joint, such as in open/exposed and/or steerable drive axle, and also in a movable rear wheel such as provided in an independent suspension system. An inner drive axle 202 has an air passageway 204 bored therein and horizontally extending along the axis of the drive axle. Air passageway 204 is configured to received pressurized air from an onboard air tank 104 as previously discussed, which passageway 204 terminates at an opening 206 defined at a distal end 208 of the inner drive axle 202 as shown. An outer drive axle 210 is shown having a respective air passageway 212 bored therein and horizontally extending along the axis of the drive axle. Air passageway 212 is configured to receive pressurized air at an inner opening 214 and communicate the pressurized air to an outer threaded opening 216 defined at the outer end of the drive axle. Each passageway 204 and 212 is defined by boring the respective inner and outer drive axle prior to assembly of the system 200. A Constant Velocity (CV) joint 220 is shown coupling the inner drive axle 202 to the outer drive axle 210, which CV joint 220 by itself is common and well known in the industry. A CV joint rubber boot 222 is shown disposed about the CV joint and the interface of the inner and outer drive axle, providing a sealed cavity 224 about this interface. Boot clamps 226 and 228 secure the boot 222 to the inner drive axle 202 and the outer drive axle 210 at respective ends, as shown. The first drive axle 202 may or may not be disposed in a differential housing.

According to the present invention, an fluid interface is defined between the inner air passageway 204 and the outer air passageway 212 to communicate pressurized air to a tire installed on a wheel assembly 260, as shown in FIGS. 22-25 and will be discussed in more detail shortly. This fluid interface is comprised of an air passageway, and multiple embodiments are described herein. In FIG. 18, this fluid interface comprises a flexible tube 232 forming a sealed conduit extending within and between drive axle opening 206 and drive axle opening 214 of the respective air passageways. The fluid interface extends across the CV Joint 220 as shown.

As shown in better detail in FIG. 19, each end of the flexible tube 232 is configured to plunge and articulate in each of the passageways 204 and 212 to accommodate the varying distance D between the distal end of the first drive axle 202 and the proximal end of the second drive axle 210 as the CV axle assembly displaces. The distal end and the proximal end of the respective drive axles are referred to herein as drive axle interfaces. Passageway 204 has a larger diameter at the opening 206 than the rest of the passageway, and forms a recess 234. Passageway 212 also has a larger diameter at opening 214 than the rest of the passageway 212 and forms a recess 236. Each recess 234 and 236 receives a retainer or bushing 238, and a seal 240 comprised of an o-ring defined between the respective retainer/bushing 238 and the respective recess 234 and 236 to establish and maintain a fluid tight seal about the tube 232 and between the passageway 204 and passageway 212. Each retainer/bushing is beveled at 270 proximate cavity 224 to prevent chaffing or damaging the tubing 232 as it extends therepast, even if the tube 232 bends during displacement of the inner and outer axles. Additionally, the seals 240 axially receive the tube 232 extending there through, as shown, such that the tube 232 can axially plunge and articulate through the seal 240 and into the respective air passageways as the outer drive shaft 210 rotates to steer the wheel and distance D varies. The seals 240 are continuously lubricated to facilitate the tube articulation.

As shown in FIG. 18, passageway 204 has an extended recess 242 extending inward from recess 234, and passageway 212 has a recess 244 extending inward from recess 236. These extended recesses 242 and 244 receive the respective ends of tube 232 extending therein and have shoulders 246 and 248 preventing the respective ends of the tube 232 from extending further into the narrowed portion of the respective passageways, wherein the tube ends may abut the respective recess. The dimension D between the first drive axle 202 and the second drive axle 210 is shown, wherein the tube has a length L that is substantially greater than dimension D even as it varies such that the tube 232 can articulate in the respective passageways, through the seals 240, but cannot slip out of the respective recesses 242 or 244 through seals 240 which would break the fluid seal and/or disrupt the fluid interface between the drive axle passageways. The tube length L is always less than dimension X defined between shoulders 246 and 248 such that the tube 232 can articulate as described.

The tube 232 needs to withstand the immense heat that occurs in the outer drive axle 210 during driving conditions, such as, due to friction in the CV joint and also due to braking systems conventionally employed. The material of tube 232 needs to meet several critical specifications, including the ability to bend, smoothly articulate in the seals 240, and withstand temperatures exceeding 300 degrees Fahrenheit and also below 0 degrees Fahrenheit. Thus, the choice of material for tube 232 is critical in this invention. A preferred material for tube 232 is PTFE because it possesses the following properties:

Very Lubricious—Lowest coefficient of friction of any polymer

Working temperature range 500° F. (260° C.) to −454° F. (−270° C.)

Chemically Resistant (all common solvents, acids and bases)

Chemically Inert

Low extractable

Excellent Dielectric Insulation Properties

Figure 20:
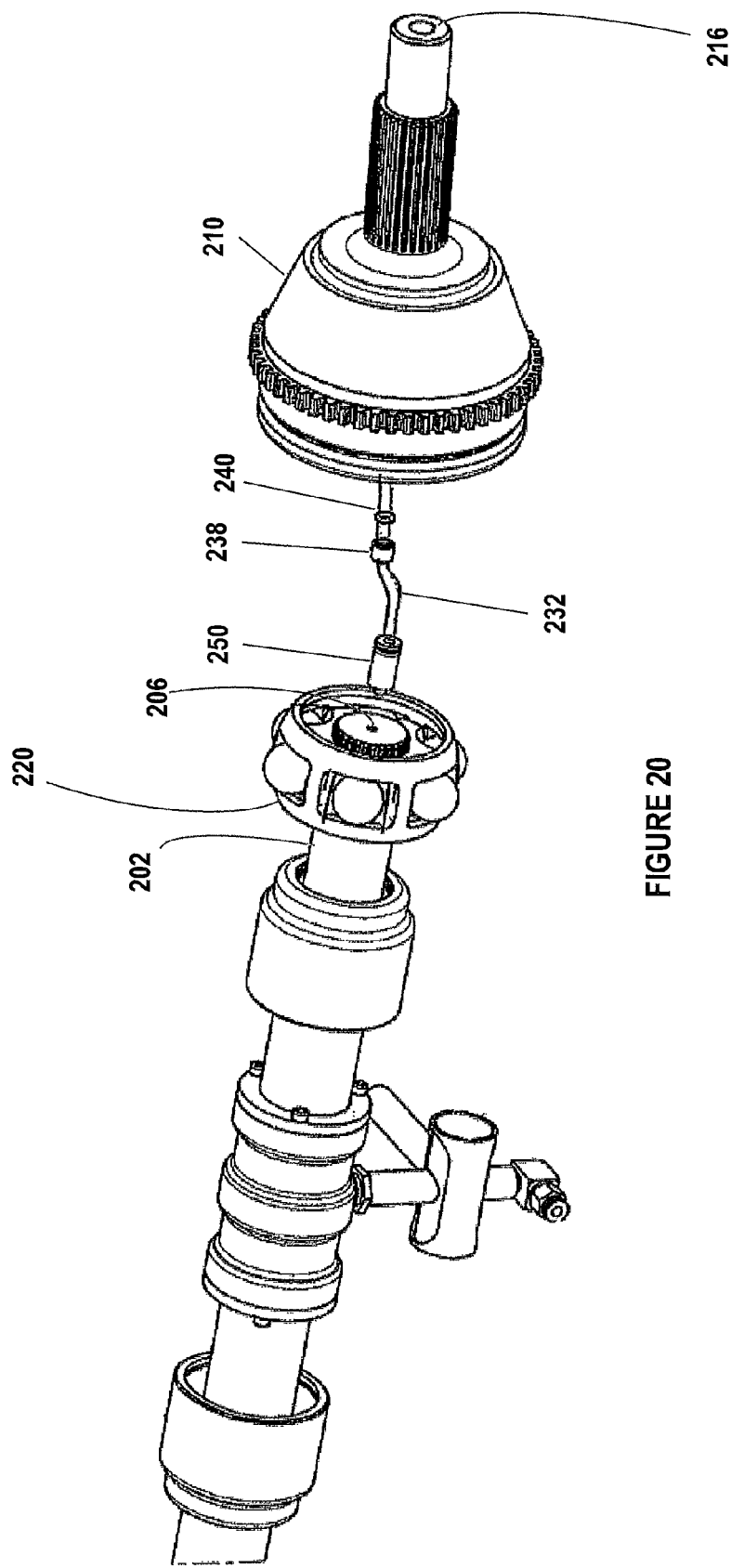
FIG. 20 is an exploded view of an alternative embodiment of the invention wherein one end of the flexible tube is fixed at one end to one of the axles, and wherein the other end of the tube plunges and articulates in the other axle.

Referring now to FIG. 20 there is shown another preferred embodiment of the invention wherein the fluid interface between the inner drive axle passageway 204 and the outer drive axle passageway is created by a tube 232 having a connector 250 on one end fixing the tube to the respective drive axle opening, and having the bushing 238 and seal 240 at the other end to facilitate plunging and articulation of the tube 232 there through. In this embodiment, the connector 250 may have a threaded end, and the respective drive axle opening is threaded to receive the connector 250 in a fixed relationship. Either drive axle 202 or 210 may be configured to threadably receive the connector 250. In this embodiment, the inner drive axle 202 is shown with a threaded opening 206 receiving the connector 250 while the tube 232 extends into the outer drive axle opening 214 as previously discussed. Advantages of this embodiment include easy installation and repair/replacement by removing the connector 250 and pulling the tube 232 from the other drive axle.

Figure 21:
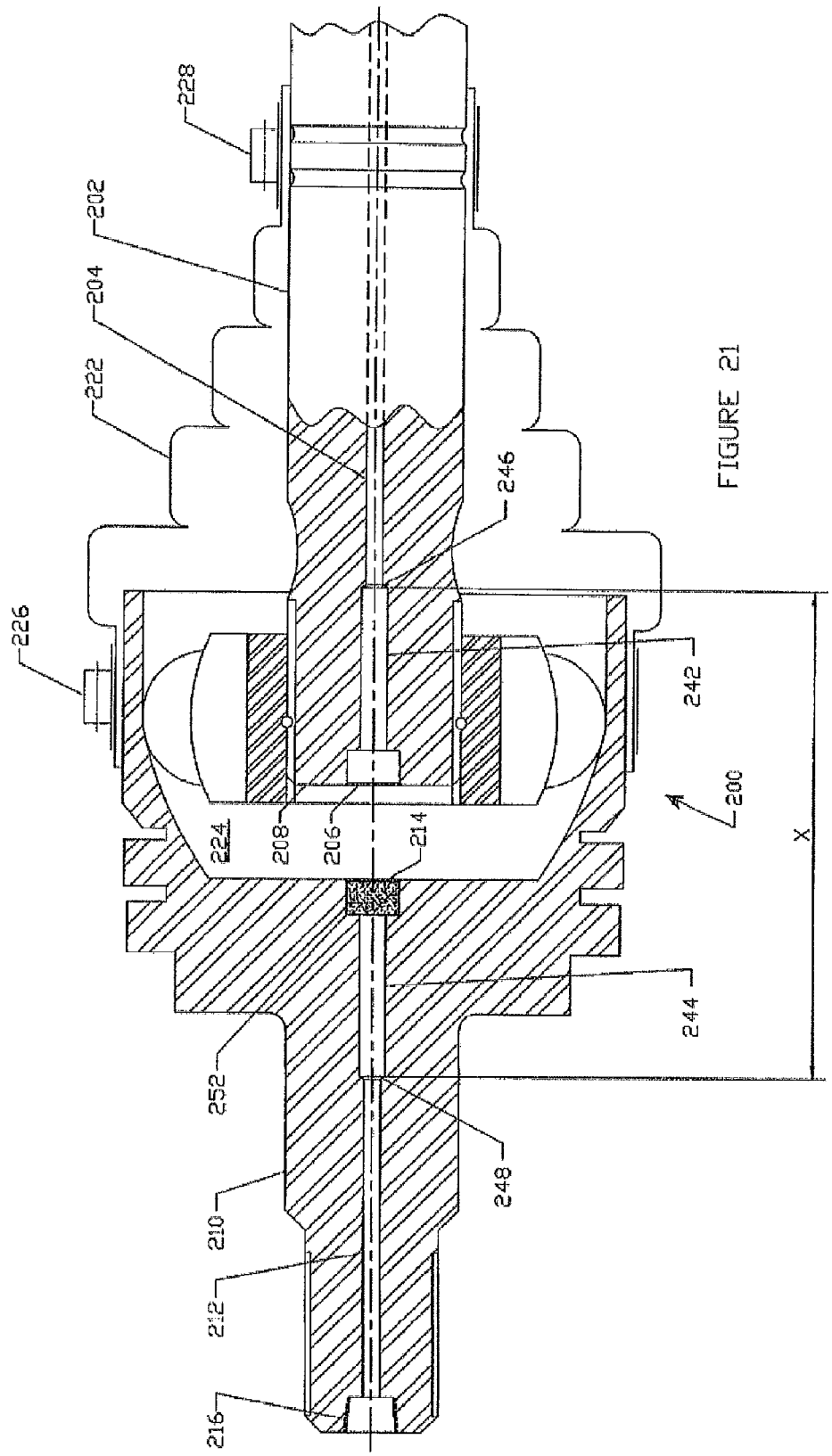
FIG. 21 is a side sectional view of an embodiment wherein a fluid interface is defined without a tube.

Referring now to FIG. 21, there is shown another embodiment of the invention where the tube 232 is omitted. The boot 222 maintains the sealed cavity 224 such that the sealed air interface exists between opening 206 of inner drive axle 202 and opening 214 of outer drive axle 210. Since the CV joint is lubricated, a filter 252 is employed to prevent lubrication from extending into the tire damaging the CV joint due to lack of lubrication. In one embodiment, an air filter can be disposed in either or both recesses 234 and 236 to prevent the lubrication from extending therein, such as a fabric, foam or other suitable material.

Figure 22:
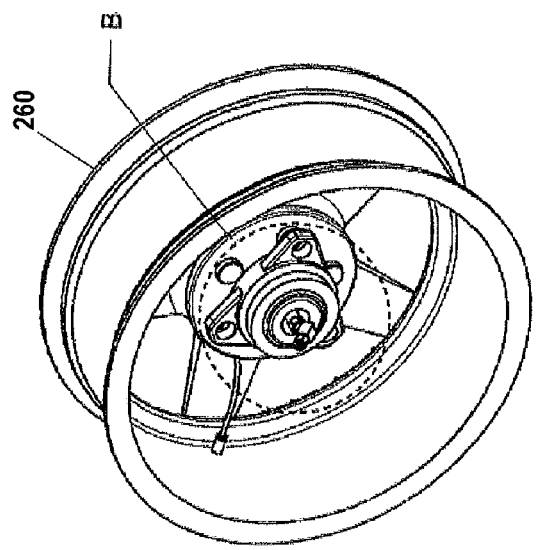
FIG. 22 is a perspective view of an open/exposed and/or steerable wheel showing the air passageway terminating at a quick disconnect positioned at the center of the wheel.

Referring now to FIG. 22, there is shown a wheel assembly 260 that is coupled to the distal end of outer drive shaft 210 such that it axially extends through the wheel assembly 260 to permit access to opening 216. Opening 216 is shown with an air connector 262 threadably coupled thereto, the connector 262 having a quick connect/disconnect 264 at a distal end thereof as better shown in FIG. 23.

Figure 24:
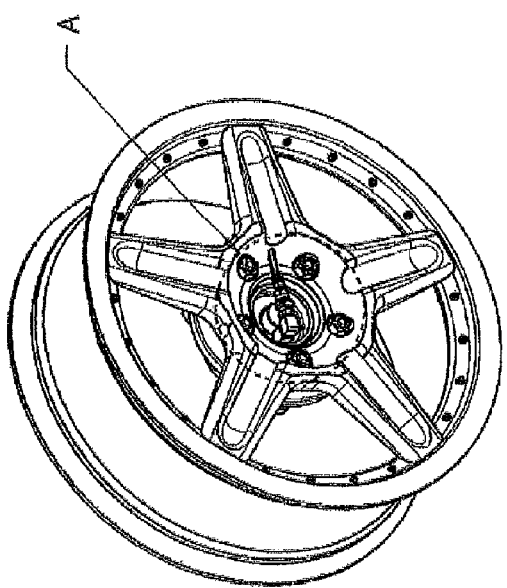
FIG. 24 is a perspective view of the steerable wheel with a quick disconnect coupled to the wheel connector and communicating pressurized air to the tire mounted on the wheel.
Figure 23:
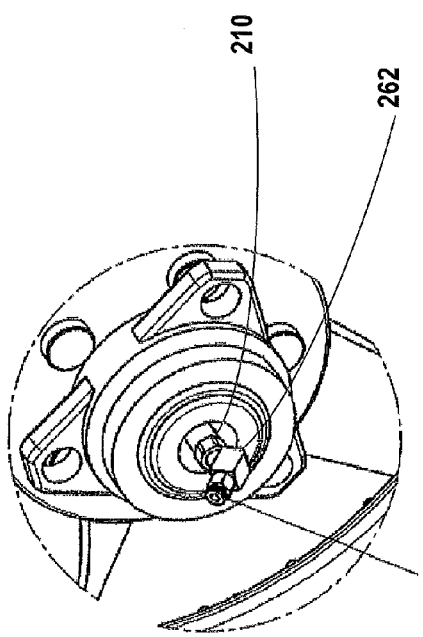
FIG. 23 is an enlarged view of the quick disconnect shown in FIG. 22.
Figure 25:
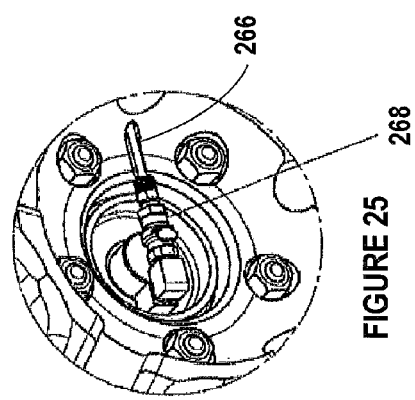
FIG. 25 is an enlarged view of the air passageway extending to the tire shown in FIG. 24.

Referring to FIG. 24 and FIG. 25, there is shown an air tube 266 forming a conduit having a quick connect/disconnect 268 fluidly coupled to quick connect/disconnect 264, and tube 266 is configured to provide pressurized air from passageway 212 of the outer drive axle 210 to a valve stem (not shown) of a tire mounted to the wheel assembly 260.

In yet another embodiment of the invention, the air system can be employed on a non-driven steerable axle. In this embodiment, the CV joint is replaced with a joint having a common rotary union installed in the distal end of the inner non-driven axle, and the fluid interface extends from the rotary union to the outer steerable axle. The tube 232 can still be used, such as implementing the connector 250 wherein opening 206 is defined in the distal end of the rotary union.

Advantageously, all embodiments of the invention provide pressurized air to a driven axle having an articulating joint, such as a CV joint, or other joints such as a universal joint. The invention is particularly well suited for implementation in an automobile or SUV, but is also advantageously suited for any vehicle, truck, tractor or apparatus with a steerable driven wheel, and also with a vertically movable rear wheel in an independent suspension system. A fluid seal is reliably established between the drive axles, even when the wheel is turned or displaced, and the fluid seal is maintained during operation where excessive temperatures are created in the drive axle. The invention is robust, and has a very low cost as existing axle designs only need to be modified by defining air passageways in, or proximate, the drive axles, and the tubing, bushings and o-rings are relatively low cost items. The CV joint axle lubrication also serves to lubricate the plunging/articulating tube when implemented. The PTFE material is ideally suited for this application. The air passageway associated with the first drive axle 202 may alternatively be defined outside of the drive shaft 202 if desired, such as by a conduit extending therealong, providing pressurized air to the distal end of the drive shaft, or directly to cavity 224.

Though the invention has been described with respect to a specific preferred embodiment, many variations and modifications will become apparent to those skilled in the art upon reading the present application. The intention is therefore that the appended claims be interpreted as broadly as possible in view of the prior art to include all such variations and modifications.

What is claimed is:

1. A vehicle axle tire inflation device, comprising:
a drive axle first portion configured to be rotatably driven, the drive axle first portion having a first interface;
a drive axle second portion coupled to the drive axle first portion by an articulating joint and having an axle flange configured to receive a wheel, the drive axle second portion having a second interface proximate the first interface;
a first conduit proximate the drive axle first portion and configured to deliver a pressurized fluid to the first interface;
a second conduit proximate the drive axle second portion and configured to deliver the pressurized fluid to the wheel; and
a fluid interface comprising an interface conduit fluidly coupling the first conduit to the second conduit, wherein the interface conduit is slidingly coupled to either the first conduit or the second conduit.

2. The device as specified in claim 1 wherein the fluid interface extends across the joint.

3. The device as specified in claim 2 wherein the fluid interface extends from the first interface to the second interface.

4. The device as specified in claim 1 wherein the interface conduit is a flexible tube.

5. The device as specified in claim 4 wherein the interface conduit is bent.

6. The device as specified in claim 4 wherein the flexible tube is comprised of a material configured to remain integrity at a temperature of at least 200 degrees Fahrenheit and below 0 degrees Fahrenheit.

7. The device as specified in claim 1 wherein the drive axle second portion has a second drive shaft, wherein the first interface is separated from the second drive shaft a distance D, and wherein the interface conduit has a length L, wherein L is greater than D.

8. The device as specified in claim 1 wherein the second conduit extends within the second drive shaft.

9. The device as specified in claim 1 wherein the interface conduit is configured to longitudinally articulate in either the first conduit or the second conduit.

10. The device as specified in claim 9 wherein the interface conduit is configured to longitudinally articulate in both the first conduit and the second conduit.

11. The device as specified in claim 9 wherein the interface conduit is configured to articulate as the joint articulates.

12. The device as specified in claim 1 wherein either the first conduit or the second conduit has a first portion receiving the interface conduit and having a diameter greater than a diameter of the interface conduit, and a second portion distal of the first portion and having a diameter smaller than the diameter of the interface conduit.

13. The device as specified in claim 12 wherein both the first conduit and the second conduit have the first portion and the second portion.

14. The device as specified in claim 1 wherein the interface conduit maintains a fluid seal between the first conduit and second conduit as it articulates into the first conduit or the second conduit.

15. The device as specified in claim 1 wherein the interface conduit is coupled to the first conduit via a fixed connector, and the interface conduit is slidingly coupled to the second conduit.

16. The device as specified in claim 1 wherein the drive axle first portion is disposed in a differential housing.

17. The device as specified in claim 1 wherein the joint is a constant velocity (CV) joint.

18. A vehicle axle tire inflation device, comprising:
a drive axle first portion configured to be rotatably driven, the drive axle first portion having a first interface;
a drive axle second portion coupled to the drive axle first portion by an articulating joint and having an axle flange configured to receive a wheel, the drive axle second portion having a second interface proximate the first interface;
a first conduit proximate the drive axle first portion and configured to deliver a pressurized fluid to the first interface;
a second conduit proximate the drive axle second portion and configured to deliver the pressurized fluid to the wheel; and
a fluid interface comprising an interface conduit fluidly coupling the first conduit to the second conduit,
wherein the joint is lubricated with lubrication, wherein the lubrication also lubricates the interface conduit as it articulates in either the first conduit or the second conduit.

19. A vehicle axle tire inflation device, comprising:
a drive axle first portion configured to be rotatably driven, the drive axle first portion having a first interface;
a drive axle second portion coupled to the drive axle first portion by an articulating joint and having an axle flange configured to receive a wheel, the drive axle second portion having a second interface proximate the first interface;
a first conduit proximate the drive axle first portion and configured to deliver a pressurized fluid to the first interface;
a second conduit proximate the drive axle second portion and configured to deliver the pressurized fluid to the wheel; and
a fluid interface comprising an interface conduit fluidly coupling the first conduit to the second conduit, wherein the drive axle first portion includes a seal, wherein the interface conduit extends through the seal.

20. The device as specified in claim 19 wherein the interface conduit is configured to articulate in the seal.

21. The device as specified in claim 20 wherein the first portion further includes a retainer configured to receive the interface conduit.

22. The device as specified in claim 21 wherein the retainer is configured to prevent chaffing of the interface conduit as it articulates therepast.

23. A vehicle axle tire inflation device, comprising:
a drive axle first portion configured to be rotatably driven, the drive axle first portion having a first interface;
a drive axle second portion coupled to the drive axle first portion by an articulating joint and having an axle flange configured to receive a wheel, the drive axle second portion having a second interface proximate the first interface;
a first conduit proximate the drive axle first portion and configured to deliver a pressurized fluid to the first interface;
a second conduit proximate the drive axle second portion and configured to deliver the pressurized fluid to the wheel; and
a fluid interface fluidly coupling the first conduit to the second conduit, wherein the fluid interface comprises a fluidly sealed cavity disposed between the first interface and the second interface, the fluidly sealed cavity comprised of a boot creating a pneumatic seal disposed about the fluidly sealed cavity.

24. The device as specified in claim 23 wherein the joint is a constant velocity (CV) joint, and the boot is sealingly disposed about the CV joint to sealingly couple the first conduit to the second conduit without use of tubing.

25. A vehicle axle tire inflation device, comprising:
an axle first portion having a first interface;
an axle second portion coupled to the axle first portion by a displaceable joint and having an axle flange configured to receive a wheel, the axle second portion having a second interface proximate the first interface;
a first conduit proximate the axle first portion and configured to deliver a pressurized fluid to the first interface;
a second conduit proximate the axle second portion and configured to deliver the pressurized fluid to the wheel; and
a fluid interface comprising an interface conduit fluidly coupling the first conduit to the second conduit, wherein the interface conduit slidingly extends into either the first conduit or the second conduit.

26. The device as specified in claim 25 wherein the fluid interface extends across the joint.

27. The device as specified in claim 26 wherein the fluid interface extends from the first interface to the second interface.

28. The device as specified in claim 25 wherein the fluid interface conduit is a flexible tube.

\* \* \* \* \*